United States Patent

[11] 3,544,725

[72] Inventors Hans Baur;
Peter Gerke; Gerhard Rolle, Krailling;
Karl Rutkowski, Pullach; Siegfried
Zahlhaas, Munich, Germany

[21] Appl. No. 670,629
[22] Filed Sept. 26, 1967
[45] Patented Dec. 1, 1970
[73] Assignee Siemens Aktiengesellschaft
Berlin and Munich, Germany
[32] Priority Sept. 29, 1966
[33] Germany
[31] No. S106239

[54] EXCHANGE ARRANGEMENT PERMITTING TEMPORARY CALL SUSPENSION FOR ACCEPTANCE OF A NEW CALL

14 Claims, 2 Drawing Figs.

[52] U.S. Cl. .......... 179/18
[51] Int. Cl. .......... H04m 3/42
[50] Field of Search .......... 179/18.19

[56] References Cited

UNITED STATES PATENTS 3,355,555 11/1967 Thelemaque .......... 179/18(.19)
3,445,602 5/1969 Gitten et al. .......... 179/18(.19)

*Primary Examiner*—Kathleen H. Claffy
*Assistant Examiner*—Thomas W. Brown
*Attorney*—Birch, Swindler, McKie & Beckett

ABSTRACT: A telephone exchange installation with subscriber stations for notifying subscribers participating in an original call connection of the receipt of a new call connection demand. The new call connection is completed in an intermediate answer connection which permits an original subscriber to accept the new call while the original call connection is preserved in an open circuit condition to be reestablished upon termination of the intermediate answer condition.

EXCHANGE ARRANGEMENT PERMITTING TEMPORARY CALL SUSPENSION FOR ACCEPTANCE OF A NEW CALL

BACKGROUND OF THE INVENTION

1. Field of the Invention

This invention relates to telephone exchange installations and in particular to telephone exchange installations providing for indicating to subscriber stations connected in a completed, original call connection the existence of a demand for a new call connection to one of the participating subscribers.

2. Description of the Prior Art

Telephone exchange installations including circuit arrangements for performing the switching functions of the type under consideration are known in the prior art. For example, in the system disclosed in German Pat. No. 430,277, a subscriber station connected in an existing call connection is notified of the existence of a new call connection demand through the transmission of an audible signal to that subscriber station. The intensity of the signal, however, is very low so that it does not interfere with speech communication in the original call connection, while nevertheless clearly indicating the existence of the new call. This indication permits the subscriber engaged in the original connection, and for whom the further call is presented, to decide whether he wishes to release the existing, original connection for receiving the waiting new call, or whether he desires to first complete the original call over the existing connection.

To effect the first operation, the subscriber for whom the new call is presented replaces his receiver, whereby the original call connection is released. The said subscriber thereupon receives a call signal as the result of the completion of the call connection for the new call and, in conventional fashion, by removing his receiver, is connected with the third subscriber who placed the new call. To effect the second operation, i.e., in which the called subscriber of the original connection desires to first complete his original call, the subscriber merely maintains communication over the existing connection whereby, after a fixed period of time, the audible signal indicating the new call is automatically terminated.

A further example of an exchange installation providing the first type of operation is set forth in German Pat. No. 558,621. In this system, the existence of a new call is indicated by the introduction of an audible signal into the existing connection which is of such a high intensity that communication in the original call connection is effectively canceled This, the subscribers of the original connection are forced to release their call connection, normally accomplished by replacing of their receivers.

This system of forcibly intervening into existing call connections necessarily is reserved for a few, specially privileged or high priority stations, for example, exchange stations which possess urgent demands for long distance call connections.

Various messenger systems are well known in the prior art for indicating call conditions to subscribers engaged in an existing call connection. For example, when a demand for a call connection to a subscriber seized in an existing call connection is received at an exchange station, the operator of the exchange station may determine this condition upon completing the connection to the called subscriber. The operator, upon receiving the indication of an existing connection, may thereupon transmit an indication of the existence of the new call to a further subscriber, such as to a further conventional subscriber station, whereby a message indicating the existence of the call may be received and communicated to the called subscriber. In this operation, the called subscriber again has the option of interrupting the existing call connection for receipt of the new call or of first completing the existing call connection.

In many countries, for example in Germany, the capability of a system for interrupting existing connections is provided only for special exchange stations. Such exchange stations may include those employed in long distance exchange offices and in subscriber installations with extension stations, e.g. a PBX switchboard. However, the switching operations as described above and as provided in the systems of the cited German patents are not permitted in the operation of public exchange installations. The reasons for not permitting such operations are obvious. Subscribers must pay for each call connection which they complete and, in such a completed call connection, are engaged in communication with one another. They cannot be expected to terminate this call connection in response to the mere existence of an audible signal which provides them with no information regarding the importance of the new call thus announced. Further, in systems forcing termination of the original call, irresponsible individuals could cause the termination of existing call connections at will, if suitable safeguards are not provided. The reinstatement of any call connection, particularly in the case of manual secondary exchange stations involves both a waste of call charges and other expenses, and a loss of time. An example of the generally recognized necessity of assuring call secrecy is the elimination of means for notifying two subscribers seized in a call connection of the existence of a new call connection demand for one of these subscribers.

SUMMARY OF THE INVENTION

It is the purpose of the invention to provide a circuit arrangement for a telephone exchange installation which provides switching capabilities for notifying new call connection demands to subscribers participating in existing call connections while avoiding the above-described and other disadvantages of the prior art systems of this type.

The circuit arrangement of the invention responds to the existence of a new call connection by providing an intermediate answer connection. In the intermediate answer connection, the switching system opens the existing or original connection and completes the new call connection to the called subscriber of the original connection. The original connection, however, remains preserved in its open condition, dependent upon the continued existence of the intermediate answer connection as well as that of the condition of waiting or nonrelease of the other participating subscriber of the original call connection. Thus, connections are maintained for reestablishing the original call connection, dependent upon the release of the intermediate answer connection for the new call, and upon the switching condition at that time of the other subscriber of the original call connection.

The system of the invention thereby renders it possible for subscribers connected in an original or existing call connection to be notified of the existence of a new call, to receive this new call in an intermediate answer connection, and thereafter to terminate the intermediate answer connection for resuming the original call connection. Thus, the duration of the intermediate answer connection is controlled directly by the subscriber receiving the new call. This control capability is of substantial importance to subscribers who find it necessary to engage in an existing call connection while awaiting the receipt of a different, and perhaps more important call. In accordance with the system of the invention, such subscribers are always prepared for receipt of the expected call, even though they conduct other calls, whether local or long distance, in the interim. On the other hand, the system of the invention permits the subscriber participating in an existing call connection to control the duration of the intermediate answer connection, and thus the interruption of the original call, through the simple expedient of brevity in the new call connection and the subsequent, immediate reinstitution by the system of the original call connection. Thus, undesirably long interruptions of long distance calls by unimportant new calls of third parties may be avoided.

These and other advantages and features of the switching circuit of the invention will be more readily appreciated with reference to the following drawings and detailed description of the invention.

BRIEF DESCRIPTION OF THE DRAWINGS

The drawings show a working example of the invention illustrating components essential to an understanding of the invention, but do not in any way limit the scope of the invention. In particular.

Figure 1:
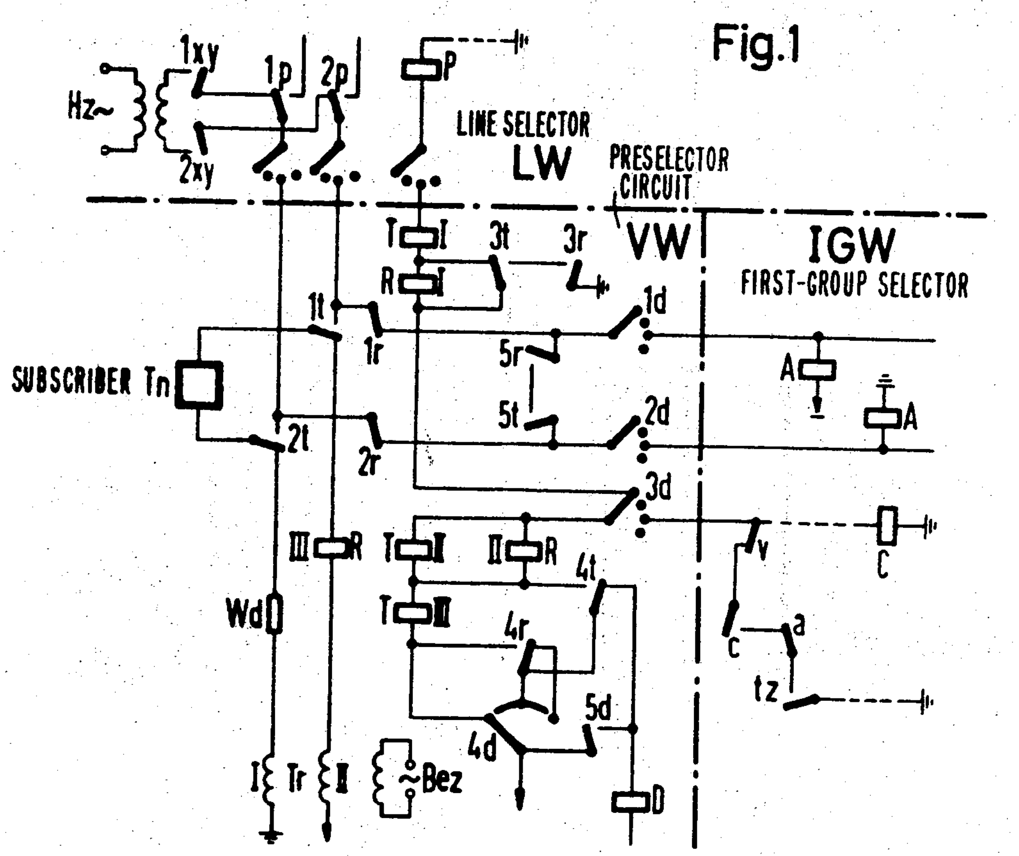
FIG. 1 shows a switching circuit in accordance with the circuit arrangement of the invention connected in a telephone installation of conventional construction employing preselectors and two-motion selectors.

The preselector circuit shown in FIG. 1 is taken from the well-known telephone step switching selector dial system. For background teachings of such systems, reference may be had to the text by Max Langer entitled "Studies on Telephone Engineering Problems," published by Siemens and Halske A. G., 1939, pages 111—112. The method of operation of the preselector circuit of FIG. 1 is well known and therefore is not explained in detail, and the following description is limited to circuit modifications necessary for incorporating the system of the invention.

A first group selector IGW is provided which includes a relay TZ (not shown) operating the contacts *tz*.The relay TZ responds at the termination of dialing a call connection signal from a calling subscriber to close its contacts *tz*. For example, and in a manner well known, if the subscriber T*n* of FIG. 1 is connected in a completed call connection with another subscriber, then contacts *c*, *a*, and *tz* are all actuated. Contact *c* is actuated by relay C, and contact *a* is actuated relay A. The preselector circuit VW is operatively associated with the subscriber T*n* and the first group selector IGW. In the case of the completed call connection, relay T of the preselector VW is excited or energized, and the relay R is not energized, in accordance with known operations.

As is well known to those skilled in the art and discussed in the publication by Langer referenced above, relay R will respond as soon as the corresponding subscriber closes his subscriber loop in order to select a connection. Over contact 4*r* and switching arm 4*d* (shown in the rest position), the winding D of a rotary magnet is excited. Winding D of the rotary magnet of the preselector is connected on its other side in the known manner with a self-interrupter (not shown). The rotary magnet is excited, by an impulse, until the switching arm 3*d* of the preselector has found a free first group selector IGW. A free first group selector is characterized by the fact that at its seizing circuit will lie a ground potential over winding C. After the preselector has found a free first group selector, relay T will respond. The latter relay will actuate contact 1*t* and 2*t* thereby disconnecting relay R. During further connection establishment, the call connection relay T will remain excited and relay R will remain unexcited. Again, all these switching operations are well known.

In accordance with the purpose for which the invention is provided, it may now be assumed that a third subscriber has dialed the subscriber station identification code for demanding a call connection to subscriber T*n*. In the processing of this connection demand, the line selector LW scans the lines associated with the subscriber T*n* to determine the condition of the subscriber station. Since the relay T of preselector VW is energized, contacts 1*t* and 2*t* are closed, completing the call connection of the subscriber T*n* through the normally closed contacts 1*r* and 2*r*, the preselector VW, and the group selector IGW, the communication lines, which may be local or long distance communication lines, and etc., to the called subscriber. The line selector LW therefore receives a busy signal indication upon scanning the leads associated with subscriber station T*n*, since the test circuit is now open in the contact branch 3*d* of the preselector VW. The third, calling subscriber demanding the new call connection therefore receives a busy signal, in a known manner.

Relay P of line selector LW, which normally serves to complete connection demands cannot respond to the new call connection demand to complete any switching under these circumstances. As a result, the contacts 1*p* and 2p of relay P remain in the normal positions indicated, and a circuit condition is established for transmission of an audible signal, represented by the transformer coupling and associated signal input labeled Hz is transmitted over the switching branches or contacts of the line selector LW which normally complete connections for the speaking paths.

The line selector LW further includes contacts 1*xy* and 2*xy* which, in the foregoing discussion have been assumed to be in a closed position, or to be replaced by a direct connection. These contacts 1*xy* and 2*xy* may be operated by conventional switching means responsive to a code signal transmitted by the calling, third subscriber to identify the subscriber connected in the original call connection to whom the new call is directed.

Each of the subscribers participating in the original connection receives the audible signal. If both subscribers decide to interrupt their existing call connection to receive the new call demanded by the unknown third subscriber, then each of the original subscribers may dial the digit 1, for example.

The foregoing operation for announcing the demand for a new call connection satisfies the criteria discussed above. As is apparent from FIG. 1 it is possible to supply an audible signal announcing the existence of a demand for a new call connection and only the subscriber which placed the original call connection may interrupt the original connection and establish the intermediate answer connection for responding to that demand. This original calling subscriber is, of course, the one against whom charges are accumulating for the original call connection. By contrast, the called subscriber of the original call connection is merely notified of the existence of the demand for a new call connection by the audible signal. This called subscriber may respond to the new call demand but only by releasing the original connection. After responding to the new call, the called subscriber may again communicate with the original calling subscriber, but only by establishing a new call connection incurring his own charges.

The establishment of the intermediate answer connection for receiving the new call proceeds as follows. By means of contact *a* in the first group selector IGW, a signal at ground potential is applied to the test conductor extending to the group selector IGW from the preselector VW. As a result, relay R, previously excited over its winding II by leakage current, is further excited to a sufficient level that it responds. The preconditioning or partial advance energization of the relay R renders its response time to this condition of contact *a*, extremely short. The test circuit for the line selector LW is now connected to ground over contact 3*r* of the new energized relay R. Relay R, excited for a short time by energization of its winding II, is now maintained energized in the test circuit over its winding I. Relay R, as now energized, opens its associated contacts 1*r* and 2*r* thereby opening the original call connection. The original call connection is maintained, however, since the two partial windings of relay A of the first group selector IGW are connected in a series energizing circuit from a negative power terminal to a ground potential terminal through the now actuated, closed contacts 5*r* and 5*t*.

Line selector LW is now prepared to perform a check. Relay P is energized and effects the necessary switching for completing the new call connection between the calling, third subscriber and the called subscriber T*n*, illustratively by actuation of its associated contacts 1*p* and 2*p*. It may readily be provided that the checking process performed by line selector LW is controlled by, or dependent upon the switching or signalling operation produced in response to signalling by the third, calling subscriber. Thus, the above-mentioned intermediate answer connection has been established between the calling, third subscriber and the subscriber T*n*.

The release of the intermediate answer connection is effected upon termination of the call connection by the calling, third subscriber. Typically, this termination requires merely that the calling, third subscriber replace his receiver and that the subscriber T$n$ of the original connection interrupt his loop circuit connection for a short time. This interruption is desirable to assure sufficient time for necessary switching operations. For example, the test circuit including relay P in the line selector LW opens and permits relay R to drop out in accordance with a delayed response time. The contacts 1$r$ and 2$r$ then return to their normally closed positions and the original call connection is reestablished.

Numerous applications of the system of the invention to telephone installations of conventional construction and operation are possible. The foregoing system related to FIG. 1 is but one example of such an embodiment, and serves merely to explain the principle of operation of the invention. Various details of the circuit operation have been omitted since they are not necessary to an explanation of the invention; these details include, for example, the method of charge accounting to be employed.

Figure 2:
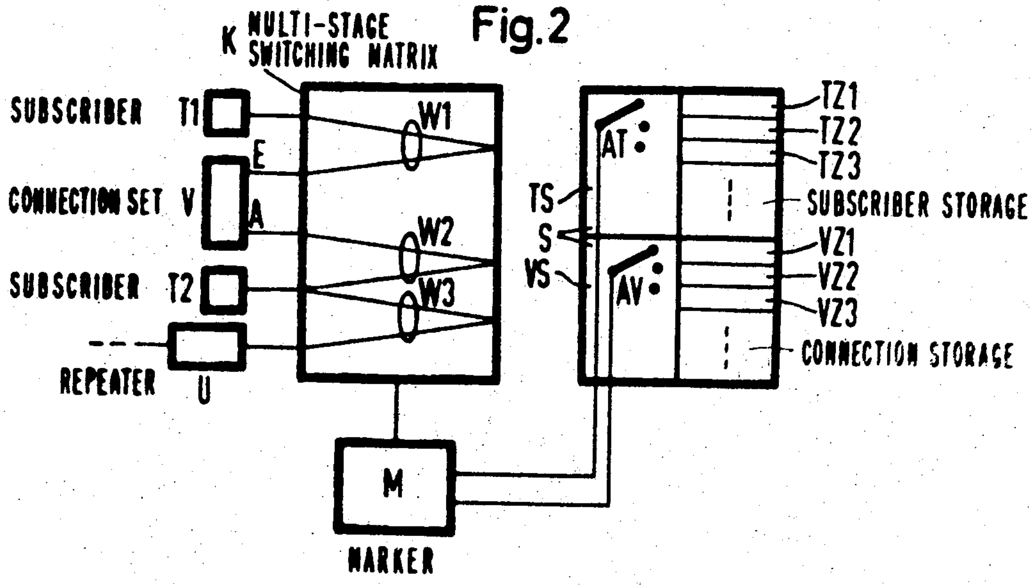
FIG. 2 shows a switching circuit in accordance with the circuit arrangement of the invention connected with a telephone exchange installation including a switching matrix of adhesion couplers for completing call connections, and wherein the information identifying each such call connection is stored in a connection storage means utilized for finding and selecting connections to be completed or switched-through the switching matrix.

In FIG. 2 there is shown a telephone exchange installation having a switching circuit arrangement including a multistage switching matrix K and a marker M serving as a central control system. The marker M determines the path of completed call connections to be established and to be released within the matrix K. Such matrices are described in the Siemens Review, vol. 34 (1967) pages 226—230. For example, three such completed call connections, W1, W2, and W3 are illustrated within the matrix K. The installation further includes a storage system S having two major components, a subscriber storage means TS and a connection storage means VS. Such storage systems are fully described in "Bell System Technical Journal," 1964, nos. 5 and 6, pages 1,836 and 2,147—2,191. The subscriber storage means TS includes a plurality of subscriber storage rows TZ1, TZ2, TZ3,.... Similarly, connection storage means VS includes a plurality of connection storage rows VZ1, VZ2, VZ3,.... The subscriber and connection storage means include finders AT and AV, respectively, controlled by the marker M.

The installation further includes a plurality of subscribers, two of which are represented as subscriber connections T1 and T2. Similarly, a plurality of connection sets and other connection apparatus may be provided, illustrated by the connection set V having an inlet E and an outlet A for connection thereof to the matrix K. Such connection sets are described at page 227 in the aforementioned Siemens Review. A plurality of connection lines typically are connected to the matrix K, one of which is indicated in FIG. 2 to which a repeater U is connected. The connection lines may be local connection exchange lines, long distance lines, and the like.

The matrix K provides for establishing connections in such a manner that two inputs of the switching matrix K which are to be connected with each other are connected to a single output of a switch. A coupler for completing such connections is provided in each switching stage of the switching matrix K. In this manner, call connections may be completed through the switching matrix K without requiring that the connection path include all possible switching stages. Minimizing the required number of switching stages is advantageous and contributes greater efficiency and higher speed to the operation.

The completion of a call connection within the matrix K is illustrated in FIG. 2. Connection W1 completes a call connection between subscriber T1 and the input terminal E of connection set V. Connection W2 completes a call connection between the output terminal A of the same connection set V and a subscriber T2. Subscriber T1 may represent a calling subscriber who has demanded a call connection to a subscriber T2 of the same exchange installation. Thus, the marker M establishes the connection paths W1 and W2 for connecting the connection set V to the subscriber station T1 to complete the call connection to the called subscriber station T2. For a purpose to be described in greater detail hereafter, a third connection W3 may be established by the marker M in response to a new call connection demand from a remote subscriber (not shown) connected to the switching matrix K by a transmission line repeater U. The connection W3 represents a demanded, or possibly completed, call connection to the subscriber T2 which is already engaged in the original call connection.

Marker M also serves to control the finders AT and AV of the subscriber and connection storage means TS and VS, respectively, to provide access to the plurality of storage units TZ1, TZ2,...VZ1,VZ2,.... These storage unit units or rows contain information necessary to the marker M in completing call connections within the matrix K.

The subscriber storage rows TZ1, TZ2,... store information corresponding to the subscriber stations and their current condition or participation in a call connection established or about to be established. The connection storage rows VZ1, VZ2,... receive and register information corresponding to call connections. Two storage rows are required for recording the pertinent information regarding the call connection completed between two subscribers of the exchange installation. Thus, for example, in a first storage row such as VZ1 there is registered information identifying the connection between subscriber T1 and the inlet E of connection set V. In the second storage row such as VZ2, there is registered information identifying the connection between output A of the connection set V and subscriber T2. Information regarding a connection between a subscriber, for example T2, and a connection line repeater, for example U, is registered in a single storage row such as VZ3 of the connection storage means VS.

Only a general discussion has been provided of the switching processes, such as the processes of pathfinding, through-switching or completion of demanded call connections within the matrix, and the subsequent release of connections upon termination of the call connection demand, since these are well known in the art. A more detailed explanation of these functions may be found in the British Pat. No. 1,029,051.

To explain the operation of the system of FIG. 2, it shall be assumed that an existing or original call connection has been established between two subscribers T1 and T2 of the exchange. More specifically, the connection set V has completed the call connection through the connection paths W1 and W2 to the subscriber stations T1 and T2, respectively, as described above. Call information identifying the necessary connections has been registered in storage means S. In connection storage row VZ1 there is registered the address of input E of connection set V, the program or path of connection W1 in the switching matrix K, and the address of subscriber T1. In connection storage row VZ2 there is registered the address of output A of connection set V, the program or path of connection W2 in the switching matrix K, and the address of subscriber T2.

In this example, the rows VZ1, VZ2,... of a connection means VS may be individually, and permanently assigned to the inputs and outputs of the connection sets and to the repeaters of th the installation. In such a system, the registering of the address of the input or output terminals of the connection set participating in a call connection, or of a line repeater associated therewith, is not necessary, since this information will automatically be provided in accordance with the abovementioned information assignment of the storage rows.

During the existence of the original call connection between subscribers T1 and T2 over the matrix connections W1 and W2, it may further be assumed that a third remote subscriber (not shown) establishes a call connection demand over repeater U to the subscriber T2. Depending upon the authorizations or capabilities provided, the third subscriber may, as a first possible operation, be authorized in advance to automatically complete a connection over connection path W3 to the subscriber T2. As a second possible operation, and in a manner also not described in detail, the third subscriber may, upon the receipt of a busy signal, and without first establishing connection path W3, cause an audible signal of the nature described previously to be sent to subscriber T2. This audible signal may present a request to subscriber T2 to respond and, for example, return a corresponding dial signal to indicate a readiness for receiving the new call.

This audible signal may be transmitted or returned to T2 in many different ways. For example, the audible signal may be transmitted to subscriber T2 during a brief interruption of the connection W2 in the switching matrix K. In this manner, only the desired called subscriber T2 of the original call connection receives the audible signal and subscriber T1 is isolated therefrom. Also as discussed previously, and in conjunction with the audible signal, the call identification code of the subscriber may be presented in an automatic manner to indicate to the desired, called subscriber the identification of the third, calling subscriber.

The switching operations and resultant connections for completing the foregoing call connections are automatically registered in the storage means S. Connection W3, required for establishing the new call connection demanded by the remote subscriber, either prior to and/or upon its completion, is registered in connection storage row VZ3. This connection W3 includes identification of the address of line repeater U, the address of subscriber T2, a waiting signal and, in a given case, the program or path of the switching elements of the matrix K for establishing the connection W3. In the subscriber storage means TS, and particularly in subscriber storage row TZ2 thereof, there is registered an identification of the address of output A of the connection set V and an identification signal representing the required intrusion for completion of the new call connection.

After receiving the new call indication signal, subscriber T2 may transmit a readiness signal to the exchange to indicate preparedness for accepting the new call in an intermediate answer connection. The information contained in storage means S is thereupon interrogated. In particular, the readiness signal is received in the connection W2 of matrix K whereby the storage row of connection storage means VS corresponding to the connection W2 is interrogated to identify the address of the subscriber T2. In accordance with the foregoing, the identification of subscriber T2 is registered in subscriber storage row TZ2. Thus, the row TZ2 is interrogated and it is determined thereby that subscriber T2 is to be connected with a transmission line repeater U. Marker M responds to the information thus derived to complete the switching steps within matrix K for establishing the call connection W3.

The connection W3, however, will not be established if the remote, calling subscriber has released the partial connection to the transmission line repeater U, prior to the called subscriber T2 acknowledging the new call demand and transmitting the readiness signal. If the remote subscriber terminates the partial connection, the information stored in connection storage row VZ3 is canceled. Since other connections may in the meantime be established over repeater U, subscriber T2 may not be connected with the repeater U.

Thus, there is also stored in the subscriber storage rows TZ1, TZ2,... not only the address of the repeater U corresponding to the desired new call connection or intrusion connection, and not only the inlet and outlet addresses of a connection set V, but also the address corresponding to the original call connection. Thus, if the remote subscriber releases under any of the conditions set forth above, the waiting signal, as well as the address of subscriber T2, is selected from the storage row VZ3 when the connection storage means VS is interrogated for information corresponding to the matrix connection W3. As a result of this interrogation, the waiting signal which indicates the condition that one of the original subscribers still waiting for reestablishment of the original call connection, causes the subscriber storage row TZ2 to be interrogated. The finder AT selects the subscriber storage row TZ2 for interrogation in accordance with its assignment to the subscriber T2, under consideration. The storage row TZ2 provides the address of the outlet A of connection set V over which the original connection proceeds. Finder AV thereupon selects storage row VZ2 of connection storage means VS, corresponding to the output A of the connection set V, to be interrogated for completing the identification of the original call connection.

After connection W3 has been released, and stored connection information in the storage row VZ2 relating thereto has been canceled, the condition of an intrusion connection and the control signals for establishing such a connection, as stored in storage row VZ2 to correspond to the connection W2, are no longer necessary and are canceled. Since the connection W2 is later released, it is clear that the intrusion connection can no longer be initiated once the original call connection has been terminated.

The immediately foregoing discussion assumes that the new call connection was not completed. On the contrary, if the subscriber T2 transmits the readiness signal and the remote subscriber maintains the call connection demand, the connection W2 is released or opened and connection W3 is completed. The switching operations for these processes cause the following operations in the storage means S. In the connection storage row VZ3, corresponding to repeater U, an intermediate answer signal is stored, instead of the waiting signal as in the immediately foregoing discussion. In connection storage row VZ2 corresponding to output A of connection set V there is registered a waiting signal instead of an intrusion signal. In subscriber storage row TZ2, corresponding to subscriber T2, the addresses of output A of connection set V and of repeater U remain in storage. These addresses therefore only change their places in storage row TZ2.

Upon release of the intermediate answer connection, the call connection W3 is opened. Marker M responds to the information in storage row VZ2 to recognize that the connection was an intermediate answer connection and that it was related to the subscriber T2 of the local exchange. Finder AT interrogates subscriber storage TS to identify the storage row TZ2 corresponding to the subscriber T2 under consideration. Marker M responds to the information stored in this row to connect the outlet A of connection set V to the subscriber T2. Marker M may complete this connection either according to the original connection path in the matrix K or in accordance with any other suitable path. If necessary, a new path-finding process and switching operation may be instituted for reestablishing a connection W2 to the subscriber T2.

During the intermediate answer connection, the nonparticipating, original subscriber such as T1 may disconnect. In this event, the connection W1 is opened whereby connection set V is released and the information contained in connection storage rows VZ1 and VZ2 is canceled. Upon release of the intermediate answer connection, such as that associated with the call connection W3 described above, the call connection W2 may not be reestablished. Among other reasons, the connection path of W2 may have been employed in completing a different call connection over the connection set V, for example, and the unsuspecting subscriber T2 must be prevented from intruding into that unrelated call connection. Thus, the release of the call connection by subscriber T1 effects the opening or release of the first connections W1 and W2 of the matrix K. Upon the cancellation of the information stored in the corresponding connection storage rows VZ1 an and VZ2, marker M receives from the latter the waiting signal and the address of subscriber T2. Marker M interrogates the subscriber storage means TS through the finder AT and determines from the storage row TZ2 assigned to subscriber T2 that the latter is in an intermediate answer connection proceeding over the repeater U. Marker M thereupon is connected to the connection storage means VS through the finder AV and cancels the intermediate answer connection information stored in the connection storage row Vz3. Thus, upon release of the intermediate answer connection, the installation positively prevents any attempt at reestablishing the original call connection.

In summary, the call notification system of the invention provides a highly effective and efficient operation of a telephone exchange installation to permit intrusion of new call demands on existing call connections. The intrusion is controlled at the option of the original calling subscriber, in recognition of the fact that the original calling subscriber is responsible for the expenses associated with the call connection. The original calling subscriber may accept the new call connection demand in an intermediate answer connection wherein the original connection is maintained in a standby condition ready to be automatically reinstated upon termination of the intermediate answer connection. However, an indication of a new call connection demand is provided to both of the original, calling and called subscribers, and the indication may specify which of the original subscribers is being requested. The flexibility of the system is quite apparent and, for example, is demonstrated by its capability of be break the original call connection circuits and clear the storage means of information relating thereto even where the original subscriber not participating in the intermediate answer connection terminates his standby connection. Thus, the system of the invention provides substantially completely automatic operation for responding to new call connection demands while preventing any unauthorized or undesired interference with existing call connections.

Numerous modifications and adaptations of the system of the invention will be apparent to those skilled in the art, and thus it is intended by the appended claims to cover all such modifications and adaptations as fall within the true spirit and scope of the invention.

We claim:

1. A circuit arrangement for a telephone installation for notifying subscribers engaged in an original call connection of the existence of a new call connection demand from a further subscriber and for processing the new call connection demand, comprising:

means responsive to a new call connection demand to indicate its existence to subscribers engaged in an original call connection;

authorization means operable by an original subscriber receiving a new call indication from said response means to authorize receipt of the new call;

control means responsive to the new call receipt authorization of an original subscriber to complete an intermediate answer connection between said further subscriber and said original subscriber in accordance with said new call connection demand while preserving the original call connection in an open condition; and said control means automatically reestablishing said original call connection upon termination of said intermediate answer connection.

2. A circuit arrangement as recited in claim 1 wherein:

said subscribers engaged in said original call connection include calling and called subscribers; and only the authorization means of the calling subscriber of the original call connection is operable to authorize receipt of the new call.

3. A circuit arrangement as recited in claim 2 wherein the subscriber station for each subscriber includes a receiver and wherein the called subscriber of an original call connection can terminate the open condition established by said control mean means by placing the receiver in a nonuse condition.

4. A circuit arrangement as recited in claim 1 wherein the original subscribers include calling and called subscribers, and wherein said control means includes an auxiliary circuit for connecting the called original subscriber in said open condition of said original call connection during the existence of the intermediate answer connection.

5. A circuit arrangement as recited in claim 1 wherein said control means comprises a switching matrix and a central control system for controlling the switching operations in the matrix to complete call connections.

6. A circuit arrangement as recited in claim 5 wherein:

said central control system includes connection storage means having a plurality of storage units for storing an identification of the path of a corresponding completed call connection in the matrix; and said storage means further includes scanning means for interrogating said plurality of storage units to identify the path of each completed connection, and for identifying each storage unit associated with a completed call connection to cancel the information registered therein upon final termination of the call connection.

7. A circuit arrangement as recited in claim 6 wherein:

said central control system includes means for opening the connections in the switching matrix for the original call connection at the initiation of an intermediate answer connection; and said connection storage includes means for preserving the storage of the identification of the paths of the original call connection for the duration of the intermediate answer connection.

8. A circuit arrangement as recited in claim 7 wherein said storage means is responsive to the initiation of said intermediate answer connection to store the identity of the connection path for the intermediate answer connection.

9. A circuit arrangement as recited in claim 8 wherein:

said scanning means is responsive to termination of the intermediate answer connection to interrogate said storage units identifying the path of the intermediate answer connection to identify the storage units registering the connection path of the corresponding original call connection; and said central control system is responsive to the information derived from the latter storage units to reestablish the original call connection.

10. A circuit arrangement as recited in claim 9 wherein:

said central control system further includes means for indicating a standby condition; and said standby condition indicating means supplements said latter storage units for indicating the continued connection of an original called subscriber in an open condition of the original call connection.

11. A circuit arrangement as recited in claim 6 wherein:

said central control system includes a plurality of connection systems, operable to establish call connections; and selected ones of said plurality of storage units are permanently and individually assigned to corresponding connection systems.

12. A circuit arrangement as recited in claim 11 wherein selected additional ones of said plurality of storage units are assigned for recording individual connections of subscriber stations.

13. A circuit arrangement as recited in claim 1 wherein there are further provided means for transmitting an audible signal to the subscribers of the original call connection for announcing the existence of a new call connection demand.

14. A circuit arrangement as recited in claim 13 wherein said control means temporarily interrupts said original call connection to permit selective transmission of the audible signal by said transmitting means to the called one of the original subscribers.